United States Patent [19]
Kallinich et al.

[11] Patent Number: 5,186,217
[45] Date of Patent: Feb. 16, 1993

[54] FLUID-IMPERVIOUS STRUCTURE AND METHOD OF MAKING SAME

[75] Inventors: Dietmar Kallinich, Gelsenkirchen; Wolfgang Kahlert, Castrop-Rauxel; Heinz Wind, Kronberg; Friedrich Lehmann, Dormagen, all of Fed. Rep. of Germany

[73] Assignees: Flachglas Consult GmbH, Gelsenkirchen; Philipp Holzmann AG, Frankfurt, both of Fed. Rep. of Germany

[21] Appl. No.: 600,776

[22] Filed: Oct. 19, 1990

[30] Foreign Application Priority Data

Oct. 21, 1989 [DE] Fed. Rep. of Germany ....... 3935172
Mar. 29, 1990 [DE] Fed. Rep. of Germany ....... 4010129

[51] Int. Cl.$^5$ ................................................ F16L 9/14
[52] U.S. Cl. ...................................... 138/149; 138/155; 138/175; 138/176; 138/DIG. 6
[58] Field of Search ............... 138/172, 175, 176, 155, 138/149, DIG. 6; 264/228

[56] References Cited

U.S. PATENT DOCUMENTS

| | | | |
|---|---|---|---|
| 1,063,672 | 6/1913 | Flannery | 138/175 |
| 1,167,159 | 1/1916 | Flannery | 138/175 |
| 1,397,708 | 11/1921 | Stowell | 138/172 |
| 1,847,676 | 3/1932 | Sherrerd et al. | 138/175 |
| 3,282,301 | 11/1966 | Ligon | 138/175 |
| 3,590,540 | 7/1971 | Johnson et al. | 138/151 |
| 4,073,318 | 2/1978 | Close et al. | 138/149 |
| 4,389,439 | 6/1983 | Clark et al. | 138/DIG. 6 |
| 4,590,971 | 5/1986 | Webster et al. | 138/172 |
| 4,771,530 | 9/1988 | Creedon | 264/228 |

FOREIGN PATENT DOCUMENTS 101512 8/1979 Japan .................................. 138/175

Primary Examiner—Harvey C. Hornsby
Assistant Examiner—James F. Hook
Attorney, Agent, or Firm—Herbert Dubno

[57] ABSTRACT

A concrete structure is lined with a statically self-supporting glass shell composed of shell segments which are themselves joined together by sealing strips. In a pipe embodiment of the invention, the shell segments form a ring spaced from the concrete body with the spacing being filled by a backfill mass so that a compressive prestress is provided to the arch shape. When used in a container, the shell may be a laminate of two or more glass layers bonded full surface together.

16 Claims, 6 Drawing Sheets

FLUID-IMPERVIOUS STRUCTURE AND METHOD OF MAKING SAME

FIELD OF THE INVENTION

Our present invention relates to a fluid-impervious structure, especially a pipe or receptacle or tank, and to a method of making same. More particularly the invention relates to the use of glass panes or shells, hereinafter referred to as shell segments, in the formation of structures primarily intended to prevent the passage of fluids through the impermeable lining formed by the glass shell segments. Such structures can be pipe assemblies and/or tanks or the like. In all cases, the structure will have a hermetic or in an even liquid-tight cladding, e.g. formed by the glass shell segments, on a support structure, e.g. of concrete.

The reference to pipe assemblies here is intended to refer to a pipe length comprised of a tubular concrete body internally lined with the sealing structure and to assemblies of such pipe lengths which are sealingly joined together. The reference to an assembly is intended to denote that the structure is assembled from a multiplicity of parts. The tanks or receptacles which can be used should not be considered to be limited in function and can be considered to include waste water treatment tanks or basins, landfill linings and other structures which are intended to be stable and to provide a seal against permeation.

BACKGROUND OF THE INVENTION

Various techniques have been developed to provide pipe assemblies which utilize a sealing cladding of a concrete body to prevent permeation of liquid through the wall of the pipe. For example, the lining of the concrete body may be composed of a synthetic resin or plastic and especially a fiber-reinforced plastic.

Such a lining is generally not self-supporting and is carried by the concrete tube and connected to the inner wall thereof by special means.

In practice it has been found that the connection is generally not permanent and the lining cannot be said to be absolutely tight, in part because most plastics do not completely exclude diffusion through the plastic.

It is also known to provide metal pipes in which a glass tube lining is embedded in the metal shell. Such constructions are not feasible where the pipe is to have a large diameter as is the case with many water lines and especially sewage lines. The inner diameters of pipe assemblies may, for example, range from 1 to 3 meters.

In tank and landfill structures (see German Patent Document DE 37 24 882), it is proposed to provide three layers of glass shell segments so that the gaps between the segments of the layers are offset from one another and the layers are bonded together by full surface adhesive bonding, thereby ensuring that the shortest permeation path is a meandering around the edges of successive layers. In this fashion it is possible to obtain very long permeation paths which can ensure a low probability of permeation of fluids through the system.

In the prior art unit mentioned, however, the glass shell segments do not form a self-supporting unit or structure and thus it has been found to be necessary to bond the three layer stack by full surface adhesive bonding to a concrete supporting structure. This is disadvantageous because changes in the concrete substructure, for example as a result of settling of the soil, can give rise to undesirable stresses in the glass layers bonded thereto and can rupture the glass and thus eliminate the permeation tightness of the assembly.

OBJECTS OF THE INVENTION

It is, therefore, the principal object of the present invention to provide a fluid-impervious structure which utilizes glass panes or glass shell segments and which is not affected by slight changes and movements of the concrete shell or wall and thus can retain the fluid tight carrier associated with the glass shell segments.

Still another object of the invention is to provide a fluid-impervious structure which is free from drawbacks of the prior art and can be fabricated in an inexpensive and economical manner.

Still another object of this invention is to provide an improved method of making a fluid-impervious structure of the type intended.

SUMMARY OF THE INVENTION

These objects are attained, in accordance with the invention by providing the glass shell segments so that they form in the static sense a unitary (and hence self-supporting) shell or plate and are connected to the wall or the concrete shell of the structure and/or are connected together with the interposition of compensating means which allows at least some relative movement of the support wall and the shell or plate.

The invention is applicable to the production of pipes in which the shell segments are segments of a cylinder, to the formation of tanks or vessels in which, again, the segments can be segments of a cylinder, and to the production of structures in which the shell segments can be of other shapes, i.e. plates for the lining of landfills or the like.

More particularly, a fluid-impervious structure according to the invention can comprise:

a support forming a wall;

a plurality of glass shell segments having juxtaposed edges and lining the wall;

means for joining the glass shell segments along the edges into a statically unitary shell; and compensating means between the shell and the wall for supporting the shell on the wall with limited relative freedom of movement of the shell and the support.

In one aspect of the invention, a pipe assembly is formed in which the lining formed by the glass shell segments is diffusion tight to a high degree. The method which will be described below pertains primarily to the fabrication of such pipe assemblies.

The lining is here formed from a multiplicity of glass shell segments which are spaced from the inner wall of a tubular concrete support body and can have a corresponding center of curvature, the segments have edges which define circumferentially extending and axially extending gaps in which sealing profile strips are received, the crossing points of the sealing strips and gaps being likewise sealed.

The sealing strips running in the axial direction connect the segments to form a complete annular glass shell which is statically constituted as a supporting arch and the intervening space between the arch and the inner wall of the concrete body is filled with a backfilling mass which can form part of the compensating means. More particularly the structure can be characterized by the following combination of features:

the support is a concrete hollow body and the wall is annular and surrounds the shell;

the shell formed by the segments is annular, of a curvature corresponding to a diameter of the fluid-impervious structure, and spaced from the wall and adjoins at least one other statically unitary shell also formed by glass shell segments, whereby axially extending and circumferentially extending gaps are defined between the edges of the glass segments and are sealed by sealing strips constituting the means for joining the glass shell segments;

the circumferentially and axially extending gaps form crossings filled with sealing members;

the glass segments and the respective strips sealing the axially extending gaps of each shell forming an arch; and the compensating means includes a backfilling mass filling a space between the arch and the wall of the concrete hollow body.

In a preferred embodiment of the invention, characterized by a high degree of sealing in the region of the gaps and high stability in the static sense, the arch is held under a compressive prestress by the backfilling mass. This compressive prestress can be generated in various ways as will be developed below. It will be understood that the compressive prestress will press the individual shell segments against the sealing strips. In the gaps between the segments forming the arch and thus integrated in the latter.

The glass shells, as may be noted, may be bent glass shell segments. The individual glass shell segments are elastically deformable within limits. The theory corresponds to bending theory of shells in classical structural engineering. The term "arch" here refers to the entire annular structure formed from the glass shells by interposition of the sealing strips.

According to another feature of the invention, the arches are mounted at singular locations, preferably by the lowermost glass shell segments, on the wall of the concrete body via respective mounting posts which can be embedded in the backfilling mass.

In the latter case, first the mounting posts are provided and then the backfilling is effected. The mounting posts, after backfilling, fulfill an additional stabilizing function in the completed pipe structure.

The arch can be formed from a multiplicity of arch rings which are sealingly connected together by circumferential sealing strips as previously mentioned or by a connecting construction utilizing intermediate glass shells likewise assembled from a plurality of segments or constituted as a single piece of glass. The circumferentially extending strips or the connecting system just described of a glass intermediate shell seal the shells or rings of the tube assembly together.

An embodiment of the invention with a specially high strength and stability can be achieved when each arch ring is formed from three glass shell segments, namely, a lower or base shell segment and two additional shell segments which are joined together at the apex of the ring, of course, using the sealing strips.

In accordance with the principles of the invention the thicknesses of the glass can be selected at will. Practical tests have shown that for most pipe assemblies of the aforedescribed assembly a glass thickness of 6 to 12 millimeters will suffice.

In accordance with another feature of the invention at the points of which the gap cross, the sealing strips of the circumferential and axially extending gap can be sealed to one another by pieces which fit into these junctions. At least several of these pieces can be formed with closable bores or passages. Through these bores, the backfilling mass can be introduced and through others of these bores air can be vented from the space between the arch and the concrete body. To obtain a very high diffusion tightness according to the invention, the sealing strips should be cemented onto the edges and/or edge regions of the glass shell segments. The strips can have a T-shaped cross section whereby the edges of the glass shell segments can engage the flanks of the shank of the T while the T arms lie against the glass shell segments along the side of the shell facing the wall of the concrete body. The backfilling mass is comprised of a concrete or mortar which, upon setting can tend to swell or which may be of the expanded or foaming type to generate the prestress.

Especially effective prestressing can be obtained when the swelling upon setting of the concrete or mortar results in an increase in the volume by 1.2 to 1.5%.

It should be understood that the backfilling mass should not set to an excessively hard state and thus will remain sufficiently elastically deformable. For this reason the backfilling mass can also be formed from a plastic or synthetic resin, for example, a foamed plastic.

The glass shell segments are comprised preferably or at least partially from chemically or thermally prestressed glass. This is especially advantageous if the pipe assembly, either upon fabrication or during monitoring, is to be used as a walkway.

The tube pipe assembly of the invention can also be formed in a system in which the concrete tubular bodies are already joined to form a pipeline and located in a subterranean application. In that case, the glass shell segments are introduced subsequent to the positioning of the pipe lengths. It is not required that the glass shells be so introduced into the pipe bodies that they have the same length as the pipe bodies, although in a preferred embodiment the lengths of the shells for a particular pipe length will correspond or be matched to the length of the concrete body thereof.

The invention also comprises a method of making a pipe assembly with the aforedescribed structure. In this method, first the concrete shell or tubular body is formed with a length corresponding to the pipe length to be fabricated. In this body, a lower glass shell segment can be mounted with the aid of support posts at a spacing from the inner wall of the concrete body so that the edge regions with reference to the length of the concrete body remain free.

Upon the lower or base glass shell segment, with the intermediary of sealing strips as described, the remaining segments of the glass shell are erected to form an arch likewise spaced from the inner wall of the concrete body. The backfilling mass is then introduced into the space between the glass shell and the concrete wall by temporarily closing of the ends of this space and thereafter, following setting of the mass, by removal of the temporary closure means.

In this method, between pipe lengths we may introduce circumferentially extending annular seals of an appropriate sealing material to fill the space along the concrete wall elastically. This elastic seal can have a thickness corresponding to that of the backfilling mass and may fill the space between the wall of the concrete body and the intermediate glass shell. According to another feature of the invention, the segments, the circumferentially extending annular seals, the elastic filling and the intermediate glass shell or the parts therein are bonded to each other and to the concrete tubular body by an adhesive.

The invention is preferred for pipe assemblies in which the support body is composed of concrete, especially steel reinforced concrete and which externally can be provided with mounting feet, an additional enclosure or sheath, etc. It can also be provided with a sleeve part and a plug part for plug and socket connection of the pipe lengths. The body, however, can also be a steel pipe length.

In the aspect of the invention relating to the construction of container structures, for example, containments for landfills, the self-supporting glass element or shell may be composed of at least three glass layers which are bonded together, preferably by full surface bonding, each of the layers being made up of segments so that the gaps between the segments of the respective layers are offset from one another. To prevent movement of the support structure from being transmitted to the laminated glass shell, the invention provides that the shell is not only a unitary self-supporting structure in the static sense, but also that the layer turned toward the support wall, i.e. the outer most layer, is formed with cutouts, bores or intersegment gaps in which holding profiles are adhesively bonded. Mounting elements can engage in these holding profiles with sufficient play to allow compensation for movement in the manner described, the mounting elements retaining the shell away from the wall so that a spacing is formed between the wall and the shell. The mounting elements can be connected to the wall directly or indirectly.

The holding profiles and the mounting elements are constituted of corrosion resistant materials. For example, the mounting elements or fastening elements can be screws or bolts.

The spacing can be provided by mounting in the wall, studs which can project from the wall. The compensating play allows the mounting of the laminated shell or plate without mounting-related stresses and permits changes in position and orientation of the wall without detrimental effect upon the glass shell with limits. Of course, the parts can be correspondingly elastically or plastically deformable.

Although holding profiles are, according to the invention, integrated into the cladding of the concrete structure, the cladding nevertheless remains a unitary self-supporting structure so connected to the wall that detrimental stresses and forces will not be transmitted to the cladding.

According to a feature of this aspect of the invention, the holding profile has a cap-shaped cross section with flanges which are bonded adhesively on both sides to the cutout or gap between the glass panes. To allow play between the mounted fastening elements and the holding profiles, the holding profiles on their side turned toward the wall can be formed with a slit or elongated hold through which the shaft of the fastening bolt passes and which can be engaged by the head of the fastening bolt.

It has been found to be advantageous, moreover, to provide a bearing plate which is traversed by the bolt and which rests against the two glass segments flanking the holding profile and spacing washers extending to the wall. These washers and the plate can be traversed by the fastening element. According to this aspect of the invention, moreover, the space between the shell and the wall is filled with a cast mass. The latter can be a cast mortar, a bituminous mass, a foamed concrete or a foamed synthetic resin or plastic. A nonanalogous gap or space is also provided between a cladding and a wall in German Patent Document DE 36 11 654, but this only serves for mounting purposes.

It is possible, in accordance with the invention, for both of the embodiments described, namely, the pipe assembly and the containment structure, to form the unitary shell or plate in the static sense as a partial structure in a prefabricated manner, for example, as a pipe length of glass shells or as a plate and to insert it into the pipe or vessel of concrete to be lined.

BRIEF DESCRIPTION OF THE DRAWING

The above and other objects, features and advantages of our invention will become more readily apparent from the following description, reference being made to the accompanying highly diagrammatic drawing in which.

SPECIFIC DESCRIPTION

Figure 1:
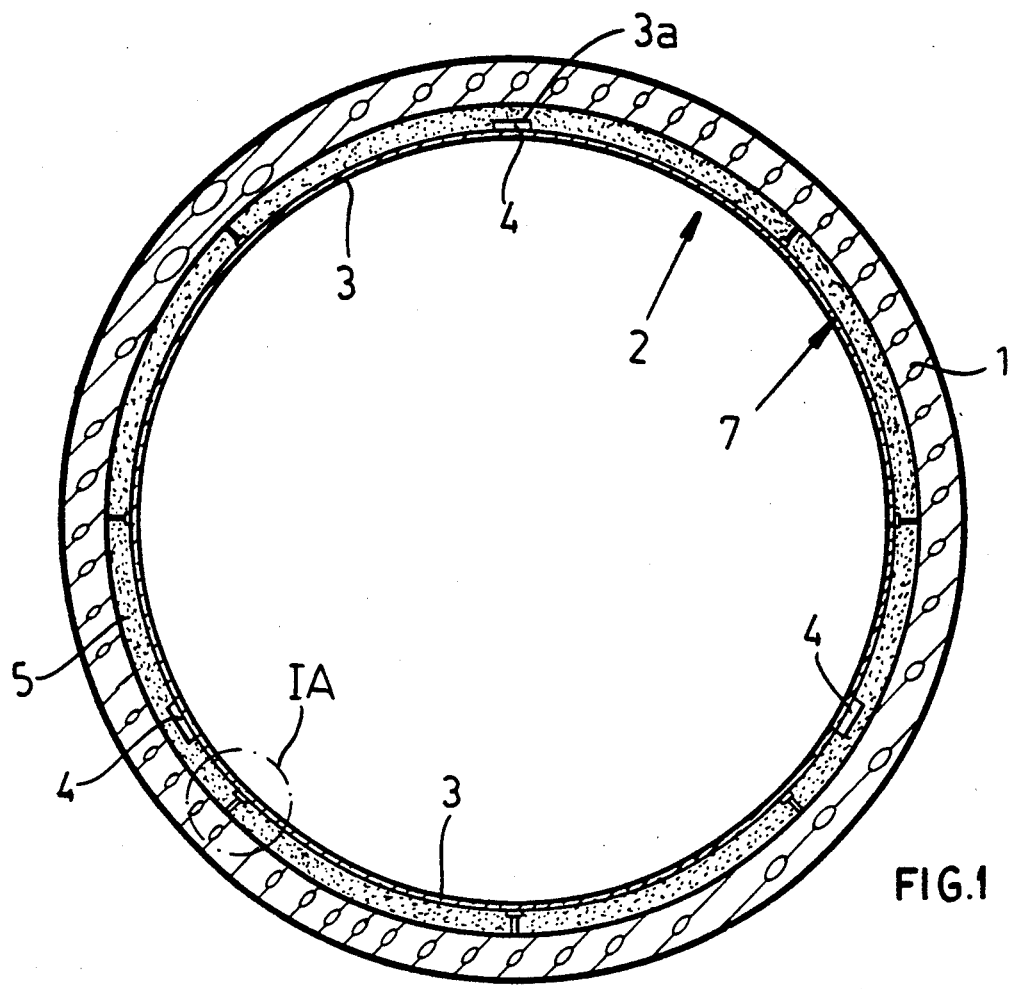
FIG. 1 is a cross sectional view of a pipe assembly according to the invention.
Figure 1A:
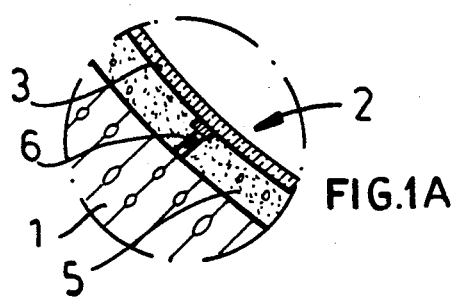
FIG. 1A is a detail view of the region I of FIG. 1.
Figure 4:
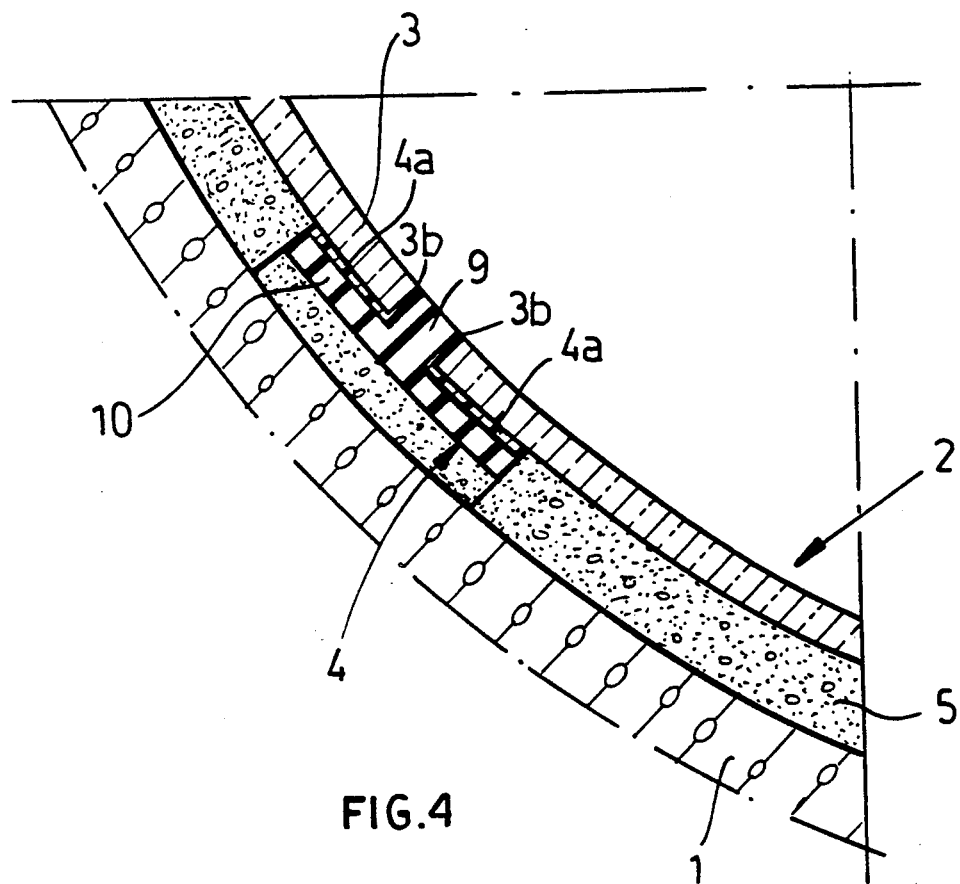
FIG. 4 is a section taken along the line IV—IV of FIG. 2.

As will be apparent from FIGS. 1, 1A and 4, a pipe assembly according to the invention comprises a concrete shell 1 which may be a cylindrical shell in the embodiments illustrated, and a cladding capable of sealing the interior of that concrete body against permeation by fluids, i.e. liquids and gases.

The cladding or lining comprises a multiplicity of glass shells 3 of annular configuration which are self-supporting and, in the case shown, cylindrical.

The glass shells 3 are spaced from the inner wall 1a of the concrete body and have the same center of curvature as the concrete body so that the inner wall 1a and the outer wall 3a of the lining define an all around space 5a of uniform thickness.

The glass shells 3 follow one another in the pipe body 1 to define circumferential gaps 4a and are composed of glass shell segments which define axially extending gaps 4b, these gaps being bridged by sealing strips or profiles 4 of an elastomeric material which, however, is of sufficient rigidity to ensure static stability and unity of the shells 3.

The crossing points of these gaps are filled by sealing members of similar material which bridge between the sealing strips and are correspondingly configured. Such a member for filling the intersections of the gaps is shown in FIG. 9.

Figure 9:
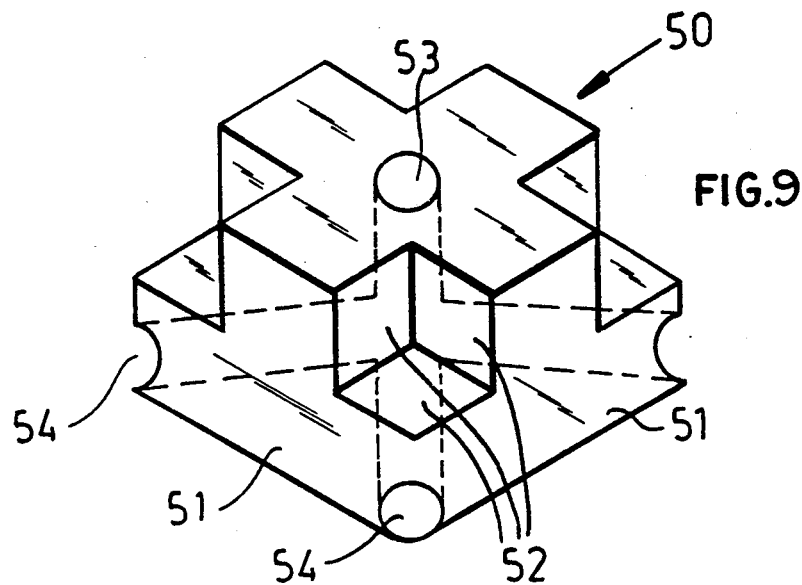
FIG. 9 is a perspective view showing a member received at the crossing points of the gaps between the glass segments of FIGS. 1 and 2.
Figure 10:
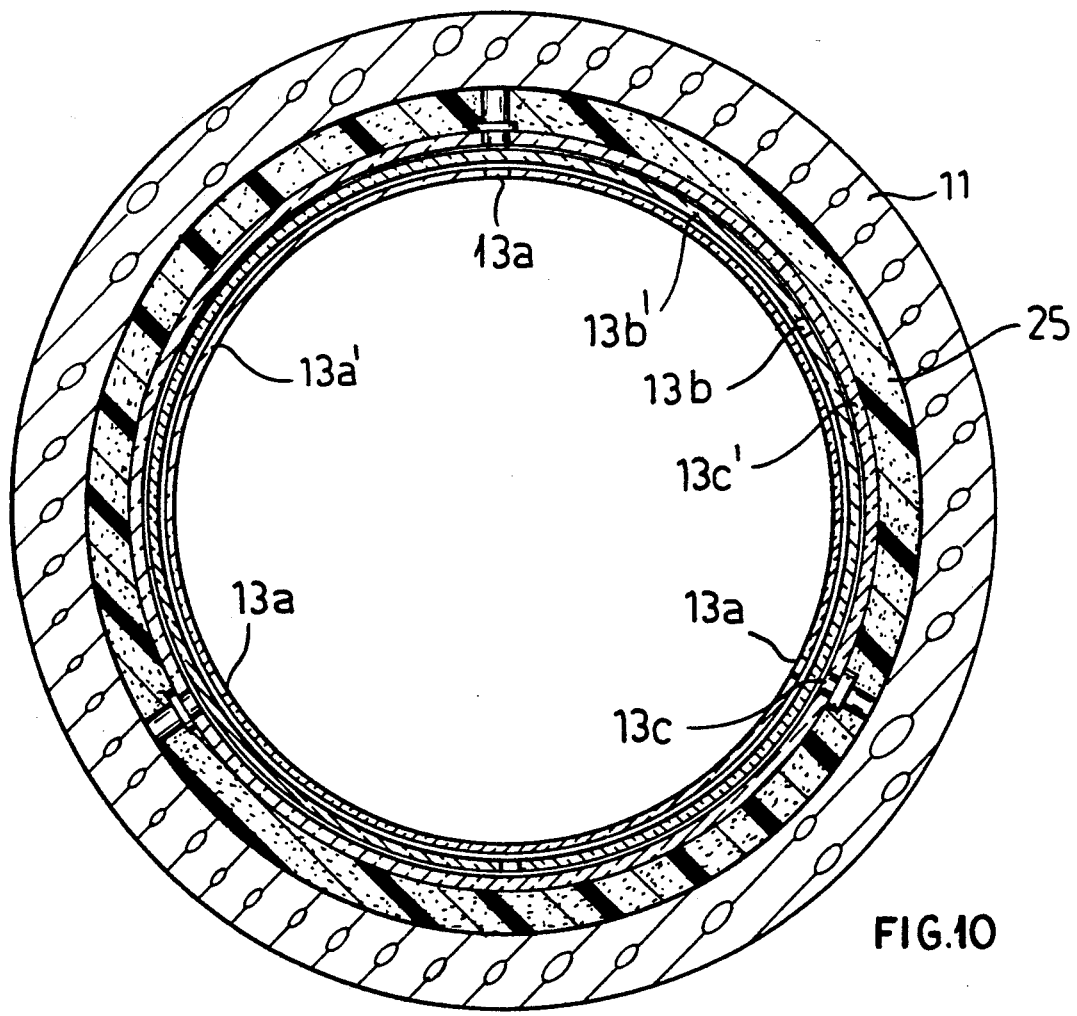
FIG. 10 is a cross sectional view through a tank lined with the glass shell of FIGS. 6 to 8.

The member 50 of FIG. 9 has T-shaped faces 51 adapted to be cemented to the sealing strips of corresponding cross section and faces 52 which engage the edges of the glass panes and the surface of a glass pane confronting the concrete body and which likewise are provided with adhesive coatings for bonding to these glass panes or shell segments.

It has been found to be advantageous to provide at least some of these intersection-filling bodies 50 with bores 53 which open at passages 54 into the space 5a to allow the backfilling of the space and the venting thereof as has been described. The bores 53 can receive plugs which can be cemented in place.

Returning to the discussion of FIGS. 1 and 4, it can be seen that the shell segments 3, together with the sealing strips 4 running in the axial direction are statically joined to form an arch configuration, e.g. into the arch rings 7. The space between each arch, as defined by the shell segments 3, and the inner wall 1a of the concrete body 1 is filled with a backfilling mass 5, so introduced into the space 5a as to apply a compressive prestress to the arch.

As can be seen from the detail of FIG. 1A, the arches or arch rings can be connected to the inner wall 5a of the concrete body 1 by mounting posts 6 at singular spaced apart locations and these posts can be embedded in the backfilling mass 5.

Figure 2:
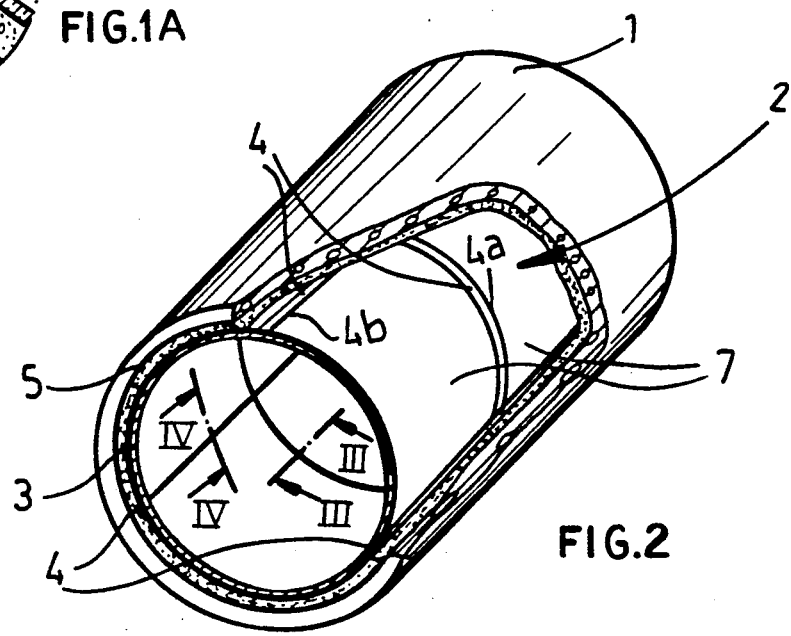
FIG. 2 is a perspective and partly broken away view of the pipe assembly drawn to a smaller scale than in FIG. 1.
Figure 5:
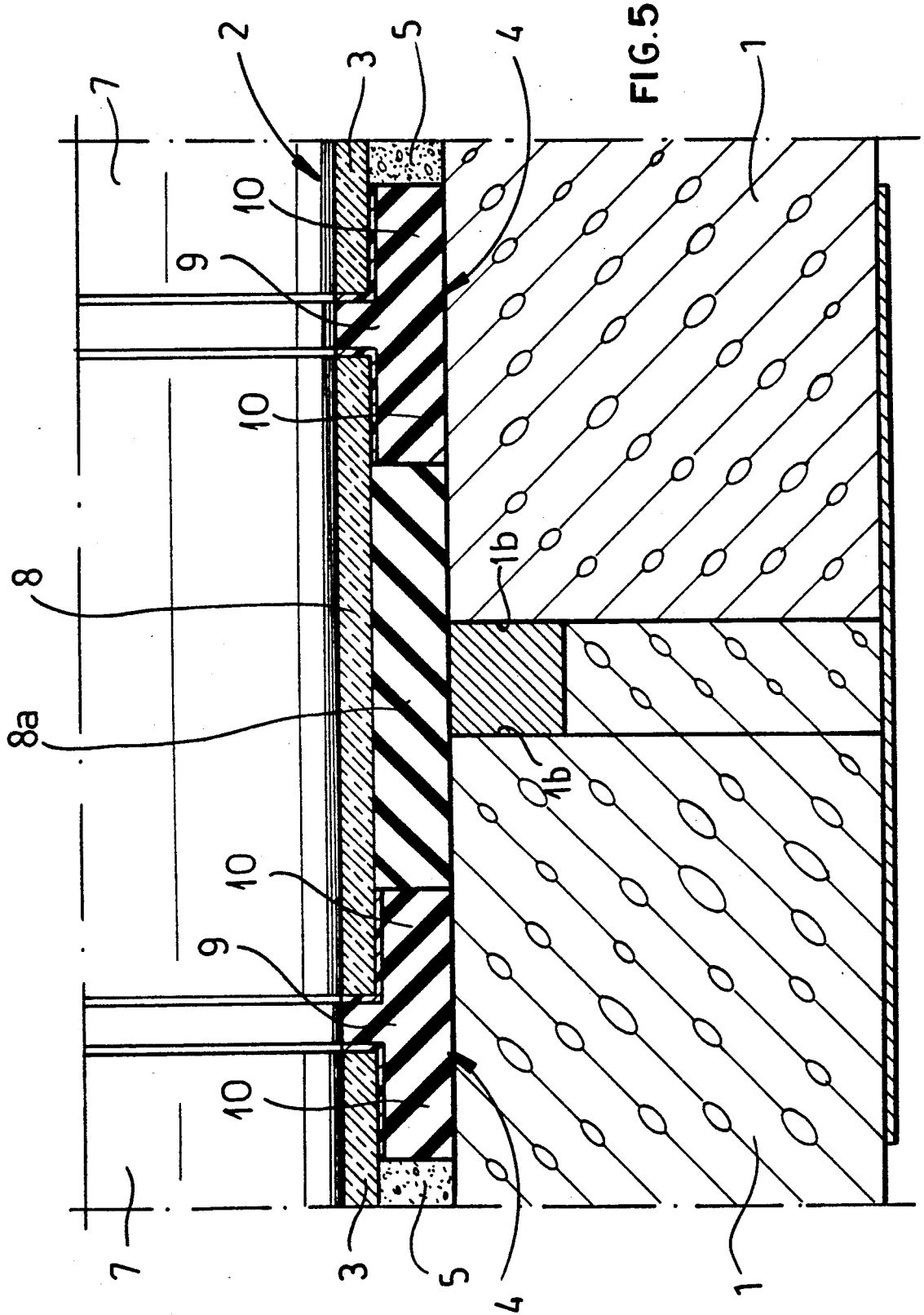
FIG. 5 is a longitudinal cross section showing the junction between two pipe lengths according to the invention.

As will be apparent form FIG. 2, the arch of each pipe section can comprise a number of arch rings 7 interconnected by the circumferential sealing strips 4 or by connecting structures utilizing intermediate glass shells 8 as has been illustrated, for example, in FIG. 5.

The arch rings 7 in the illustrated embodiment preferably comprise three glass shell segments 3, namely a lower or base shell segment and two additional shell segments which adjoin via a longitudinal sealing strip at the apex 3a of the lining along a generatrix thereof. The base shell segment can also be referred to herein as a sole shell segment.

Figure 3:
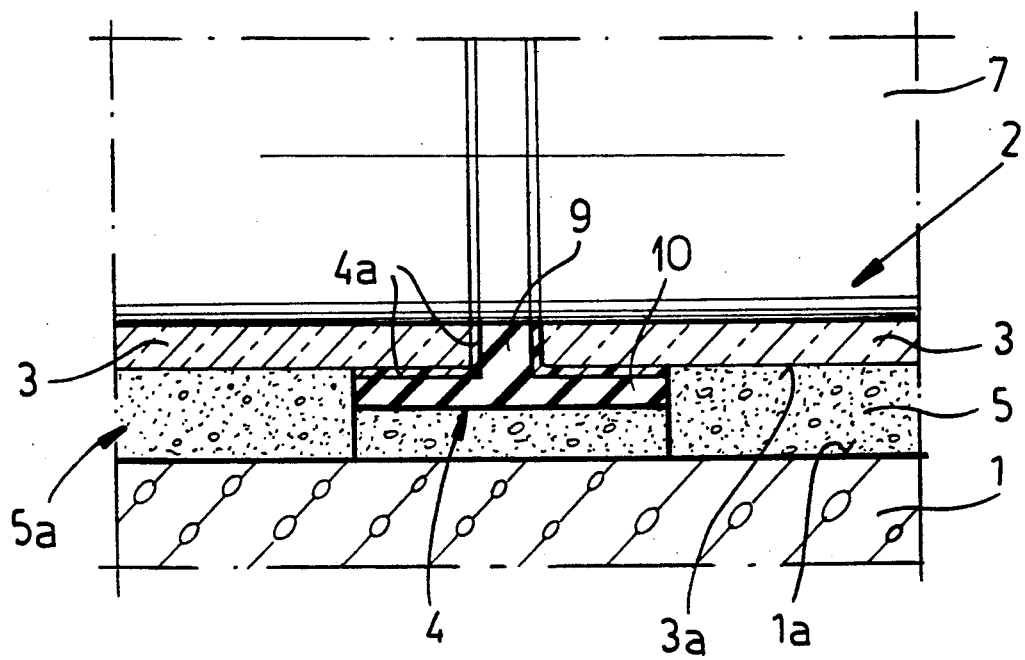
FIG. 3 is a section taken along the line III—III of FIG. 2.

Adhesive layers 4a visible only in FIGS. 3 and 4 can serve to bond the sealing strips 4 to the juxtaposed edges of the shell segments 3 and to regions of the shells adjoining these edges as has been illustrated.

In the embodiment shown and in the preferred embodiment of the invention, the sealing strips 4 are of T-shaped cross section and have a T shank 9 braced between and cemented at its flanks to the spacedly juxtaposed edges 3b of the glass shell segments defining the gap 4a filled with this strip.

The shank 9 is unitary with the T arms 10 engaging beneath the shell segments 3 and located between the outer surfaces 3a thereof and the inner wall 1a of the concrete body 1.

The backfilling mass 5 comprises concrete, preferably a so-called extrudable mortar or a swellable mortar to generate the compressive prestress previously described or a foamed synthetic resin. When the term concrete is used, herein, therefore we also intend by such use to include mortar and especially extrudable or emplaceable mortar.

The base shell segment can be composed of safety glass, especially single-sheet safety glass which can be thermally or chemically prestressed. Indeed, all of the glass shell segments can be composed of such safety glass.

The assembly is so constructed that the glass shells in the longitudinal direction, i.e. in the length of the concrete pipe bodies have a corresponding length. However, as will be apparent from FIG. 5, the glass shell segments 3 of the ring 7 can be set back from the ends 1b of the concrete bodies 1 to allow the intermediate glass shell 8 to be interposed between them. In addition, joints and sealing strips 4 as previously described can be interposed between the intermediate shell 8 and the rings 7. An elastomeric body 8a can be provided between the strips 4. Turning now to FIGS. 6–8 and 10, it can be seen that a vessel, e.g. a cylindrical vessel, can be formed utilizing a laminate of glass layers composed of shell segments as has been described earlier. The principle can be used for the lining of basins and in the sealing of landfill structures, etc.

Figure 6:
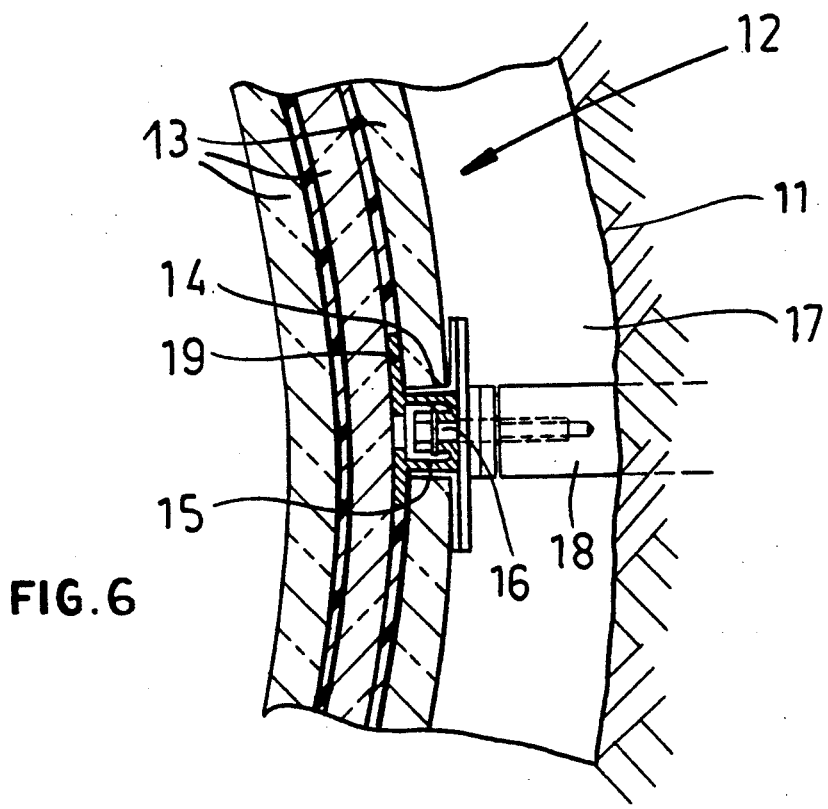
FIG. 6 is a cross sectional view showing a detail of the connection of the glass shell to the concrete structure or a vessel according to the invention.
Figure 6A:
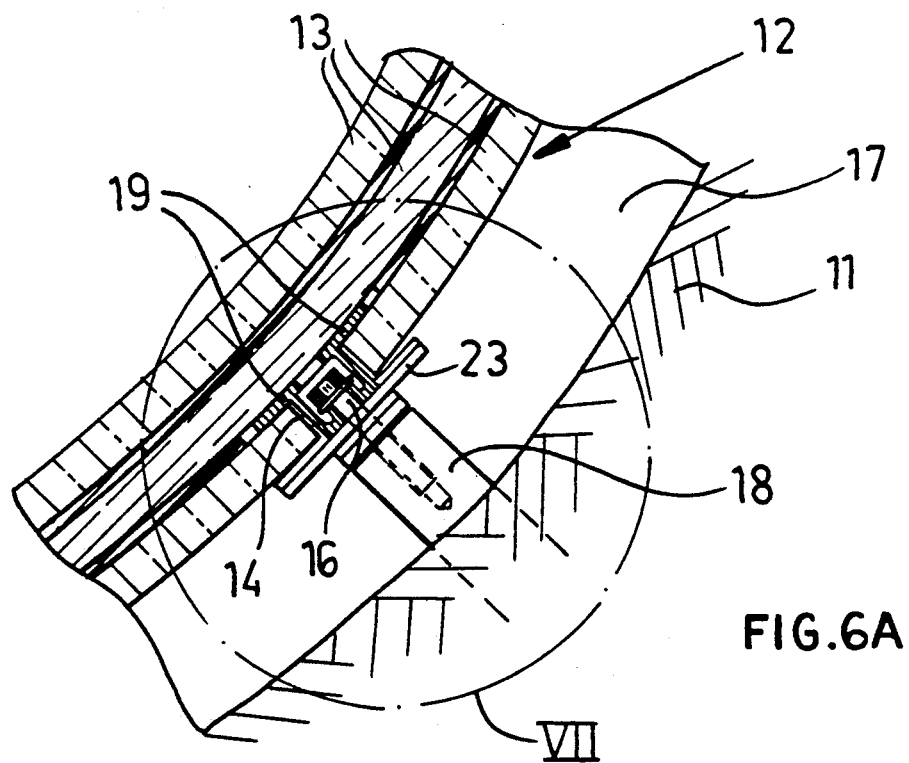
FIG. 6A shows another cross section representing another part of the structure of FIG. 6.

The illustrated vessel is seen in FIGS. 6 and 6A in horizontal section and comprises a wall 11 of concrete or reinforced concrete, and a lining internally or externally as shown at 12 of at least two and preferably at least three glass layers 13 each of which may be composed of a plurality of segments in which the joints of the segments are offset from one another. For example, the joints 13a of the innermost layer 13a' (FIG. 10) are angularly offset by approximately 60° from the joints 13 of the intermediate layer 13b' and these, in turn, are offset from the joints 13c of the outer most layer 13c' by 60°. The backfilling mass is here represented at 25.

Figure 7:
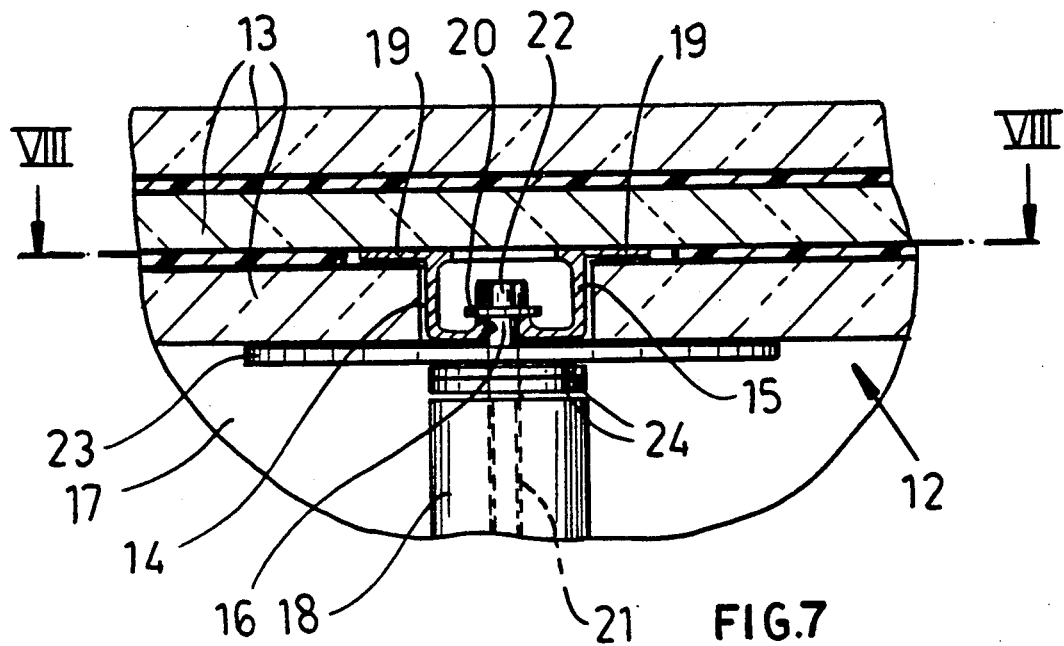
FIG. 7 is an enlarged detail section of the region VII of FIG. 6A.
Figure 8:
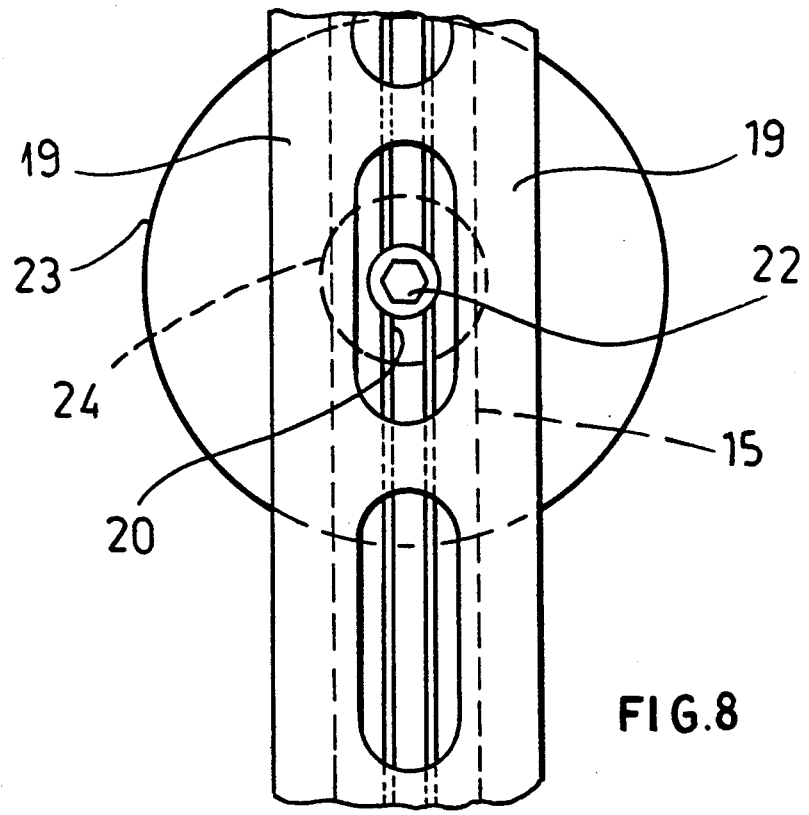
FIG. 8 is a cross sectional view taken along the line VIII—VIII of FIG. 7.

As will be apparent from FIGS. 6–8, the glass layers 13 are cemented together coextensively, i.e. over their full juxtaposed surfaces so that the resulting laminate shell forms a self-supporting, unitary static shell ring in the sense described. The outermost layer 13c', however, is formed with cutouts or gaps, e.g. gaps 14 which can coincide with the joints 13c previously mentioned in which holding profiles 15 are cemented. These holding profiles 15 are engaged by fastening or mounting elements in the form of fastening screws 16.

In the embodiment shown only one such holding profile 15 with a single screw 16 has been illustrated in detail. As can be seen from FIGS. 6, 6A and 7, however, the fastening screws 16 and the respective holding elements 15 maintain a gap 17 between the lining 12 and the wall 11 which can be filled with the mass 25 mentioned previously. The mounting elements can also include pegs 18 anchored in the concrete body forming the wall 11 and into which the screw 16 is threaded, the pegs 18 forming spacers.

The holding profile 15 has a cap-shaped cross section with flanges 19 which are cemented to the glass panes of the lining 12 on either side of the gap 14.

As will be apparent from FIG. 8, the holding profiles 15 are formed with slots 20 or elongated bores or openings traversed by the shank 21 of the screw 16 and spanned by the head 22 of the screw. The head 22 of the screw is thus braced, e.g. via a washer, against the holding profile 15.

Between the holding profile 15 and the post 18 and thus overlying the glass shell lining 12 is a support plate 23 which can be spaced from the peg 18 by spacing washers 24, the plate 23 and the spacing washers being traversed by the screw 16.

We claim:
1. A pipe assembly, comprising:
a tubular concrete support forming a cylindrical wall;

a plurality of glass shell segments having juxta posed edges and lining said wall, said edges forming axially extending and circumferentially extending gaps having intersections at crossings of said gaps; means for joining said glass shell segments along said edges into a statically unitary shell forming a space with said wall and including axially extending sealing strips filling said axially extending gaps and braced between the edges defining same, circumferential arc segmental sealing strips braced between the edges defining said circumferentially extending gaps, and sealing bodies filling said intersections and sealingly engaging said strips; and compensating means including a backfilling mass filling said space between said shell and said wall and interposed between said strips and said wall for supporting said shell on said wall with limited relative freedom of movement of said shell and said support while exerting annular compressive force on said shell and said axially extending strips whereby an arch is formed by said segments and said axially extending strips.

2. The pipe assembly defined in claim 1 wherein said shell is held under compressive prestress by said backfilling mass.

3. The pipe assembly defined in claim 1, further comprising a multiplicity of posts bridging between said wall and said shells at spaced apart locations for supporting said shells on said wall at said locations, said posts being embedded in said backfilling mass.

4. The pipe assembly defined in claim 1 wherein said arch is formed from a plurality of arch rings, each in the form of a respective one of said shells and connected together by intermediate glass shells and respective sealing strips.

5. The pipe assembly defined in claim 1 wherein each of said shells is comprised of three glass shell segments including a lower base shell segment and two additional shell segments connected together at an apex of the respective shell.

6. The pipe assembly defined in claim 1 wherein at least some of said members are formed with closable passages.

7. The pipe assembly defined in claim 1 wherein said strips are adhesively bonded to said glass shell segments along edges thereof.

8. The pipe assembly defined in claim 1 wherein said strips of T-shaped cross sections with shanks of the respective T abutting juxtaposed edges of adjoining glass shell segments and arms of the respective T interposed between said glass shell segments and said wall.

9. The pipe assembly defined in claim 1 wherein said backfilling mass is selected from the group which consists of concrete, mortar and foamed synthetic resin.

10. The pipe assembly defined in claim 1 wherein said glass shell segments are each composed of single-sheet safety glass.

11. The pipe assembly defined in claim 1 wherein said shells collectively have an axial length substantially matched to an axial length of said body.

12. The pipe assembly defined in claim 1 wherein said shell is composed of at least two layers having mutually offset joints between shell segments thereof, one of said layers closest to said wall being formed with openings receiving respective holding profiles, mounting elements engaging said holding profiles and forming said compensating means for securing said shell on said wall with said limited relative freedom of movement of said shell and said support, said mounting elements defining a spacing between said shell and said wall.

13. The pipe assembly defined in claim 12 wherein said holding profile has a cap-shaped cross section with flanges cemented to opposite sides of said opening.

14. The pipe assembly defined in claim 12 wherein said holding profile has along a side turned toward said wall, at least one slot traversed by a shaft of a respective mounting element and is engaged by a head of the mounting element.

15. The pipe assembly defined in claim 12 wherein said mounting element is provided with spacing washers and a bracing plate traversed by said mounting element and abutting said glass shell segments adjacent said holding profile.

16. The pipe assembly defined in claim 12 wherein said spacing is filled with a casting composition.

* * * * *